(12) United States Patent
Joe

(10) Patent No.: US 11,438,337 B2
(45) Date of Patent: Sep. 6, 2022

(54) MULTI-TENANT SUPPORT USER CLOUD ACCESS

(71) Applicant: SAP SE, Walldorf (DE)

(72) Inventor: Richard Joe, San Jose, CA (US)

(73) Assignee: SAP SE, Walldorf (DE)

( * ) Notice: Subject to any disclaimer, the term of this patent is extended or adjusted under 35 U.S.C. 154(b) by 602 days.

(21) Appl. No.: 15/843,304

(22) Filed: Dec. 15, 2017

(65) Prior Publication Data
US 2019/0190917 A1    Jun. 20, 2019

(51) Int. Cl.
| H04L 29/06 | (2006.01) |
| H04L 9/40 | (2022.01) |
| H04L 67/10 | (2022.01) |
| G06F 16/951 | (2019.01) |
| H04L 67/1097 | (2022.01) |

(52) U.S. Cl.
CPC .......... *H04L 63/101* (2013.01); *G06F 16/951* (2019.01); *H04L 67/10* (2013.01); *H04L 67/1097* (2013.01)

(58) Field of Classification Search
CPC ... H04L 63/101; H04L 67/10; H04L 67/1097; G06F 16/951; G06F 17/30864
See application file for complete search history.

(56) References Cited

U.S. PATENT DOCUMENTS

| 8,949,939 | B2 | 2/2015 | Peddada | |
| 9,781,122 | B1* | 10/2017 | Wilson | H04L 63/101 |
| 10,225,253 | B2* | 3/2019 | Pogrebinsky | H04L 67/10 |
| 2007/0186102 | A1* | 8/2007 | Ng | G06F 21/6227 713/165 |
| 2012/0066755 | A1 | 3/2012 | Peddada et al. | |
| 2012/0096271 | A1* | 4/2012 | Ramarathinam | H04L 63/0807 713/172 |
| 2012/0096521 | A1* | 4/2012 | Peddada | G06F 21/629 726/4 |
| 2012/0242778 | A1* | 9/2012 | Ayers | H04L 63/029 348/14.09 |
| 2013/0091171 | A1 | 4/2013 | Lee | |

(Continued)

OTHER PUBLICATIONS

Random House Webster's College Dictionary, 8, 663 (2nd Random House ed. 1999).*

*Primary Examiner* — Tongoc Tran
(74) *Attorney, Agent, or Firm* — Sterne, Kessler, Goldstein & Fox P.L.L.C.

(57) ABSTRACT

Disclosed herein are system, method, and computer program product embodiments for generating support user permissions to allow access to a cloud computing platform. In an embodiment, a host system may host a cloud computing platform and may provide access to the cloud computing platform to a tenant system. The tenant system may then facilitate access to the cloud computing platform to users. The tenant system may maintain a list of authorized users separate from the host system. In an embodiment, if the tenant system requests support from the host system to fix a problem, the host system is able to generate access for support users to access the cloud computing platform to troubleshoot the problem. In an embodiment, even though the tenant system maintains a separate list of authorized users, the host system is able to generate support user permissions.

20 Claims, 6 Drawing Sheets

(56) References Cited

U.S. PATENT DOCUMENTS

| | | | |
|---|---|---|---|
| 2013/0111558 A1* | 5/2013 | Sangubhatla | G06F 21/44 726/4 |
| 2014/0245389 A1* | 8/2014 | Oberheide | H04L 63/0815 726/3 |
| 2015/0180894 A1* | 6/2015 | Sadovsky | H04L 67/22 726/22 |
| 2016/0132214 A1* | 5/2016 | Koushik | H04L 63/10 715/741 |
| 2016/0134619 A1* | 5/2016 | Mikheev | H04L 63/0815 726/8 |
| 2016/0149882 A1* | 5/2016 | Srivastava | H04L 51/046 726/4 |
| 2016/0173475 A1 | 6/2016 | Srinivasan et al. | |
| 2017/0171233 A1 | 6/2017 | Odenheimer et al. | |
| 2017/0331812 A1* | 11/2017 | Lander | H04L 63/0815 |
| 2017/0331829 A1* | 11/2017 | Lander | G06F 21/6218 |
| 2017/0332238 A1* | 11/2017 | Bansal | H04W 12/08 |
| 2018/0063143 A1* | 3/2018 | Wilson | H04L 63/0281 |
| 2018/0131685 A1* | 5/2018 | Sridhar | H04L 67/02 |
| 2018/0159856 A1* | 6/2018 | Gujarathi | H04L 63/0281 |
| 2018/0276074 A1* | 9/2018 | Leggette | G06F 11/1076 |
| 2018/0285750 A1* | 10/2018 | Purushothaman | H04L 43/0823 |
| 2019/0005024 A1* | 1/2019 | Somech | G06F 16/243 |
| 2019/0222568 A1* | 7/2019 | Sridhar | H04L 63/0815 |
| 2019/0230032 A1* | 7/2019 | Landau | G06F 15/173 |

* cited by examiner

MULTI-TENANT SUPPORT USER CLOUD ACCESS

BACKGROUND

As computing evolves from native environments to cloud-based platforms, computing complexity also grows. For example, the security architecture for cloud-based computing follows complex protocols to ensure that authorized users are able to access the cloud-based computing functions.

In some cases, a host system or vendor system may supply the cloud-based computing platforms to tenant systems or customer systems. These tenant systems may employ personalized security protocols separate from the host system security protocols. For example, the tenant systems may maintain their own list of authorized user accounts. In these cases, host systems are unable to easily access the tenant systems to debug issues or troubleshoot problems with the cloud-based computing platforms because the tenant system maintains locked or sometimes confidential user authentication records.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1A:
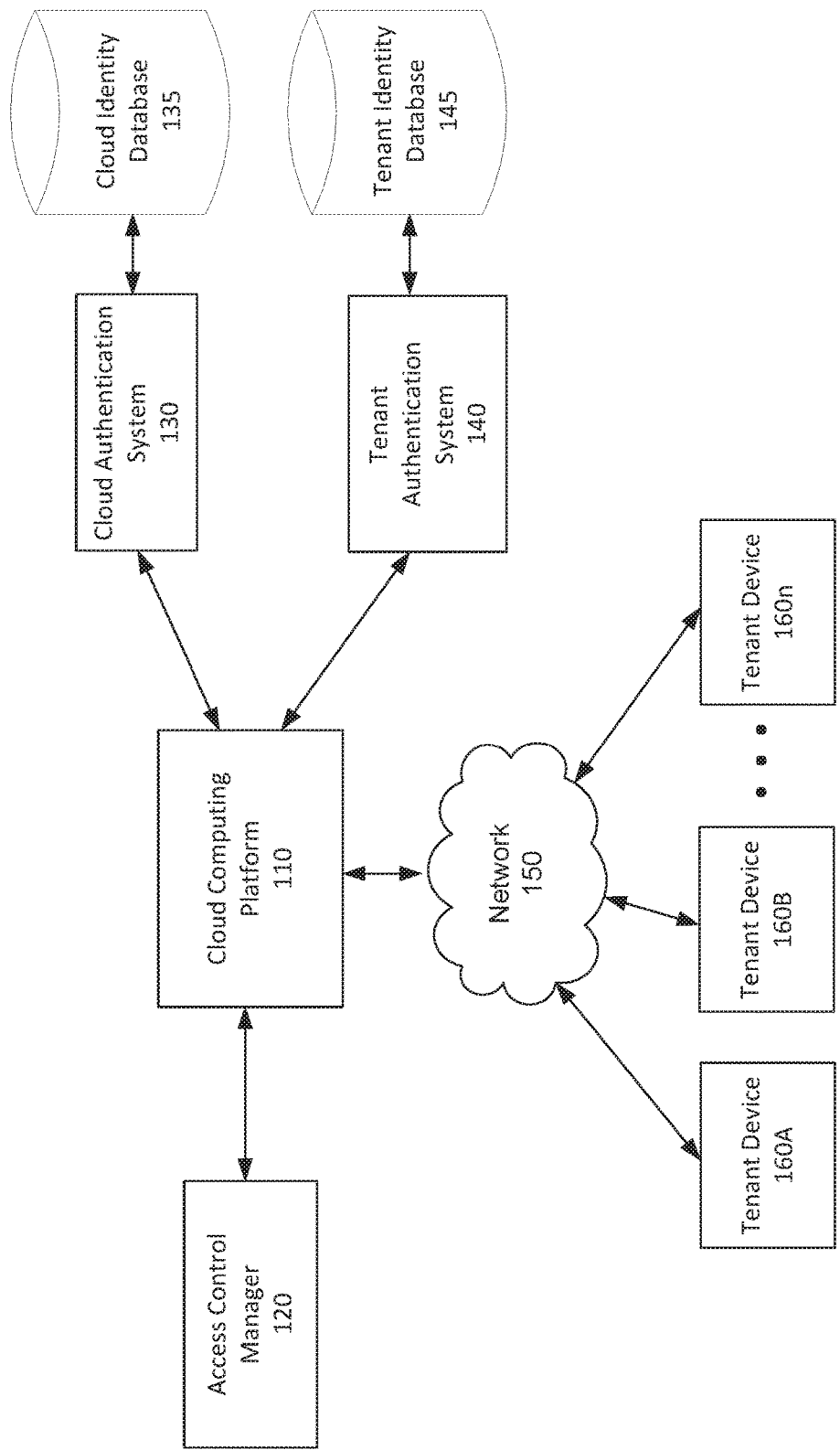
FIG. 1A depicts a block diagram of a cloud computing security environment, according to some embodiments.

Provided herein are system, apparatus, device, method and/or computer program product embodiments, and/or combinations and sub-combinations thereof, for granting support access to cloud computing platforms.

In an embodiment, a host system and/or vendor system may provide a cloud-based computing platform to a tenant system and/or customer system. The tenant system may implement the cloud-based computing platform on local tenant system hardware or may access the cloud-based computing platform via an Internet connection to the host system. In an embodiment, the tenant system may maintain a list of user accounts authorized to utilize the tenant system to access the cloud-based computing platform. This list may include, for example, employees in a corporate setting, officers in a military setting, or other user designations in other cloud-based computing settings. Using this list, the tenant system may authenticate individuals attempting to access the cloud-based computing platform provided by the tenant system and/or the host system.

At times, the tenant system may encounter a programming error, crash, require debugging or troubleshooting, experience latency issues, and/or may face problems requiring the support from the host system and/or technicians associated with the host system to aid in the maintenance of the tenant system. In some cases, however, the tenant system may maintain a confidential list of authorized users inaccessible to the host system. When the tenant system maintains its own list of authorized users, the host system is not able to utilize the confidential list to gain access to the tenant system to troubleshoot the problems.

Similarly, due to security concerns, the tenant system may not wish to add new users to the confidential list to allow access to host system support individuals. Generating new users may lead to abuse and/or may reduce the security of the tenant system. For example, a company policy may require that users be employees of the company in order to be added to the list of authorized users.

Because the list may be confidential and/or because the tenant system may be restricted from adding users to the list, support users associated with the host system may face difficulties in troubleshooting the cloud-based computing platform via the tenant system. Support users may resort to other time-consuming processes, such as attempting to share a screen with a tenant system user, in order to troubleshoot issues.

The systems and methods described herein provide a system and method to grant access to support users and allow the support users to access the cloud computing platform to troubleshoot issues. In an embodiment, support users may access the cloud computing platform in a manner similar to the tenant system to be able to view the issues as if the support user accessed the cloud computing platform as a tenant system user.

In an embodiment, the host system employs an access control manager to authenticate support users using a meta cloud authentication system and cloud identity database. Support users are able to authenticate using this meta cloud authentication as an authentication system separate from the tenant system but are still able to access the cloud computing platform. In an embodiment, the host system may maintain the cloud authentication system and cloud identity database in a secure manner to enable support users to utilize the cloud authentication system. This cloud authentication system may operate in conjunction with the cloud computing platform, allowing host system access to the cloud computing platform independent from the tenant system access. In an embodiment, the cloud authentication system is able to grant support user permissions to user accounts already stored in the cloud identity database and/or generate new user accounts in the cloud identity database having support user permissions.

In an embodiment, the cloud authentication system and/or the cloud identity database are utilized when accessing the host system so that support users are able to access host systems as well as the cloud computing platform using a single sign-on. This configuration also yields a secure manner for accessing the cloud computing platform because support users authenticated to access the cloud computing platform will have also been authenticated to use the host system. In an embodiment, tying these forms of authentication together may yield a secure method system for accessing cloud computing platforms controlled by tenant systems. Using granted support user permissions, authenticated support users are able to log into the cloud computing platform and troubleshoot issues even if the tenant system utilizes a confidential list of authorized users.

These features will now be discussed with respect to the corresponding figures.

FIG. 1A depicts a block diagram of a cloud computing security environment 100, according to some embodiments. In an embodiment, cloud computing security environment 100 may include cloud computing platform 110, access control manager 120, cloud authentication system 130, cloud identity database 135, tenant authentication system 140, tenant identity database 145, network 150, and/or tenant device 160A, 160B, . . . , 160n. In an embodiment, cloud computing security environment 100 operates to provide cloud computing functionality from cloud computing platform 110 to tenant devices 160.

Figure 1B:
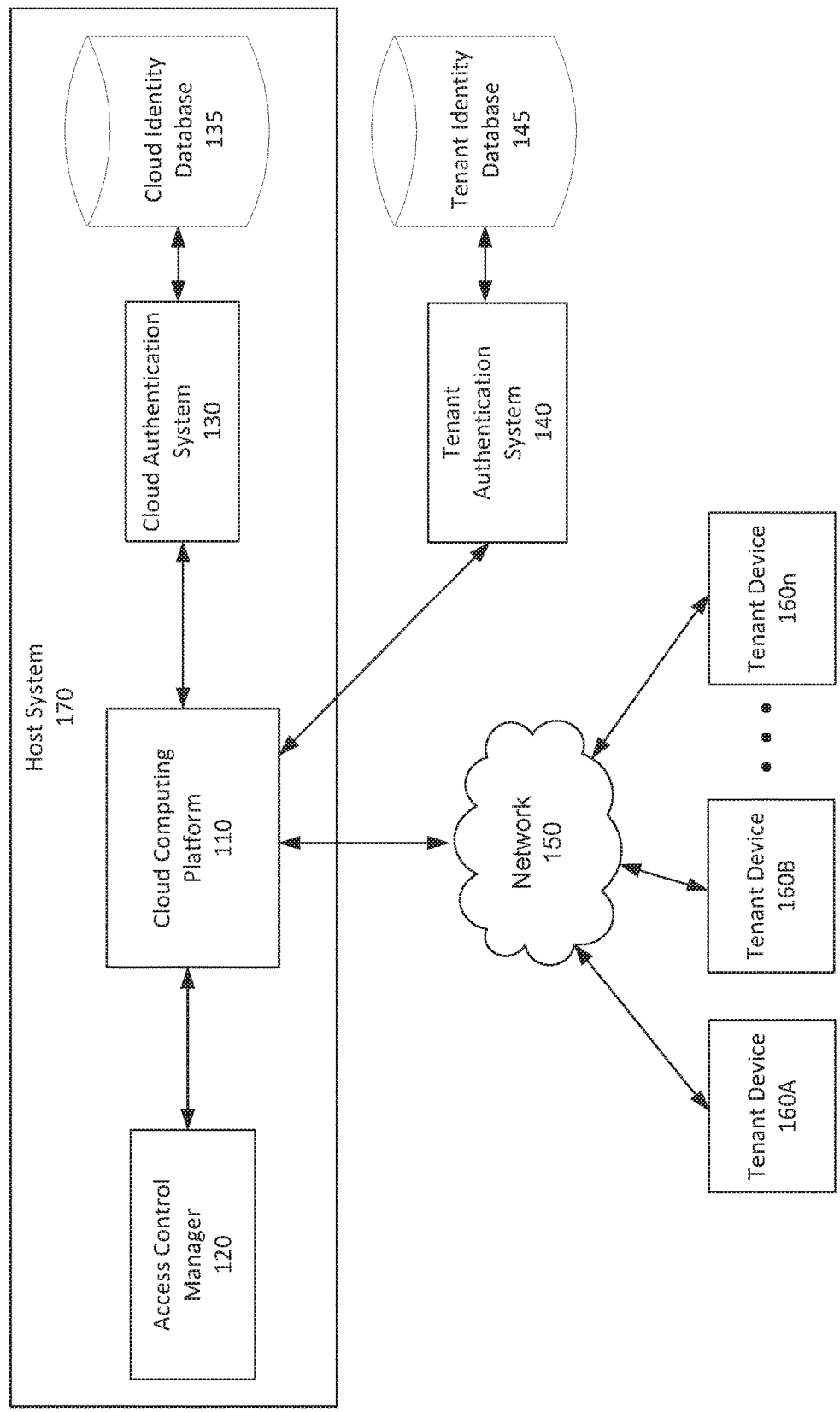
FIG. 1B depicts a block diagram of a cloud computing security environment highlighting a host system, according to some embodiments.
Figure 1C:
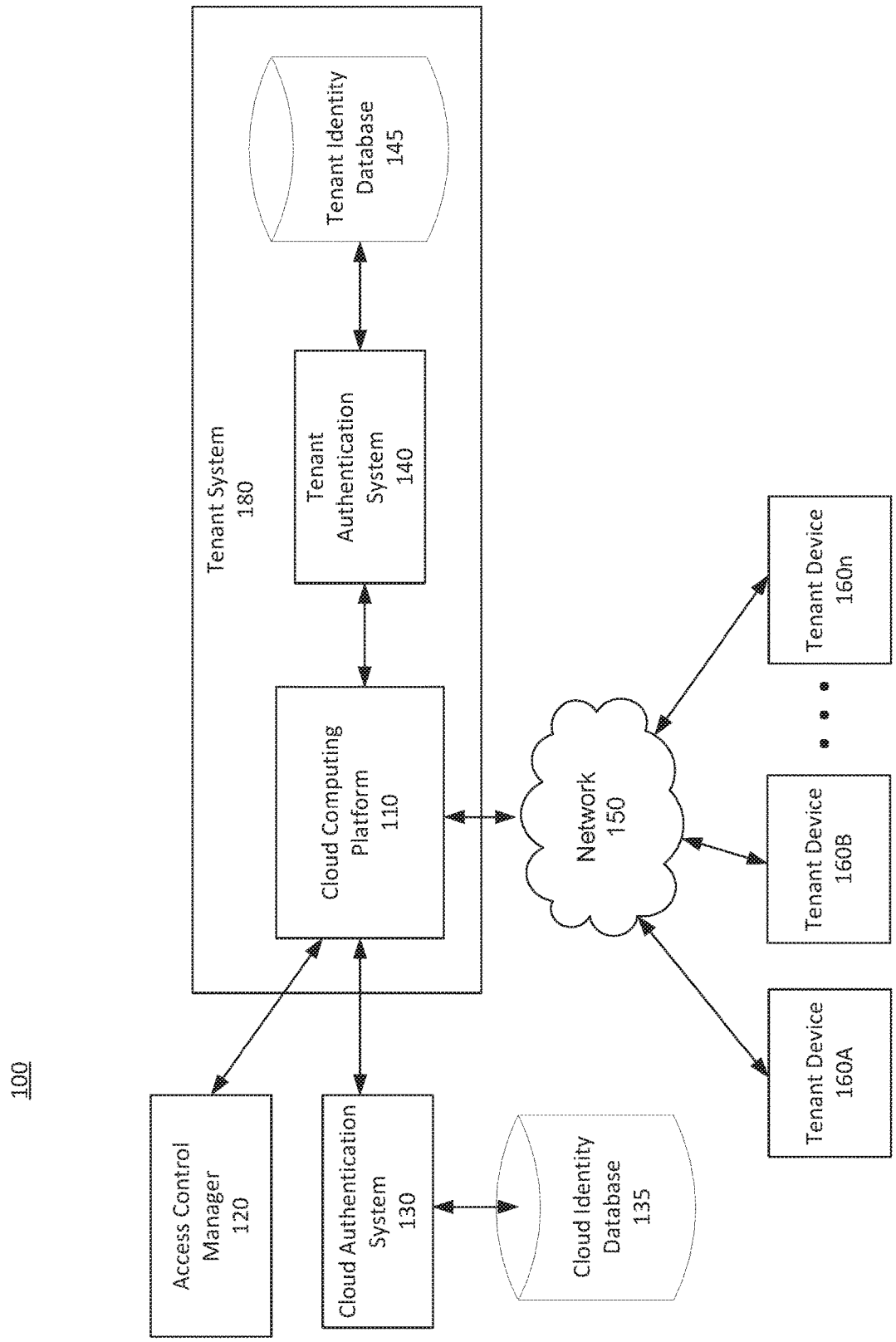
FIG. 1C depicts a block diagram of a cloud computing security environment highlighting a tenant system, according to some embodiments.

FIG. 1B depicts a block diagram of the cloud computing security environment 100 highlighting a host system 170, according to some embodiments. FIG. 1C depicts the block diagram of a cloud computing security environment 100 highlighting a tenant system 180, according to some embodiments. Computing platform 110 may be maintained by either host system 170 or tenant system 180. Tenant devices 160 may utilize tenant system 180 to obtain access to cloud computing platform 110. Tenant devices 160 may include devices and/or services capable of allowing a user to access cloud computing platform 110. For example, tenant devices 160 may include computer hardware, an Internet browser, a virtual private network client, and/or other services or software applications that allow access to cloud computing platform 110. When tenant devices 160 attempt to access cloud computing platform 110, cloud computing platform 110 may request login credentials from the particular tenant device 160 seeking access. The login credentials may include a username, password, electronic or digital certificate, an encrypted passcode, and/or other forms of user authentication.

Using the login credentials, cloud computing platform 110 may authenticate the tenant device 160 using cloud authentication system 130 and/or tenant authentication system 140. In an embodiment, cloud authentication system 130 and cloud identity database 135 are operated by host system 170 and/or provide host-based user identifications and/or host-based user accounts. In an embodiment, host system 170 provides access to cloud computing platform 110 and utilizes cloud authentication system 130 and cloud identity database 135 to authenticate tenant devices 160 and/or users attempting to access cloud computing platform 110.

In contrast, in an embodiment, cloud computing platform 110 may authenticate a tenant device 160 using tenant authentication system 140 and/or tenant identity database 145. In an embodiment, tenant authentication system 140 and tenant identity database 145 are operated by tenant system 180 and/or provide tenant-based user identification and/or tenant-based user accounts. For example, tenant system 180 may host and/or provide access to cloud computing platform 110 to tenant devices 160. In an embodiment, host system 170 may instantiate cloud computing platform 110 and tenant system 180 may facilitate tenant device 160 access to cloud computing platform 110.

To facilitate this access, tenant system 180 may utilize tenant authentication system 140 and/or tenant identity database 145. In an embodiment, tenant system 180 may maintain a list of authorized user accounts and/or login credentials corresponding to the user accounts in tenant identity database 145. In an embodiment, tenant system 180 may maintain this list in a manner that is confidential to host system 170. While host system 170 may host cloud computing platform 110 and/or may supply access to cloud computing platform 110 to tenant devices 160, tenant system 180 may still act as the gatekeeper to granting access via the use of tenant authentication system 140 and tenant identity database 145. For example, if a tenant device 160 attempts to access cloud computing platform 110, tenant system 180 may receive login credentials from the tenant device 160 and utilize tenant authentication system 140 to authenticate the tenant device 160 by comparing the received login credentials with login credentials stored in tenant identity database 145. In an embodiment, use of tenant identity database 145 by tenant system 180 allows tenant system 180 to maintain a list of authorized user accounts separate and/or hidden from host system 170. This configuration may allow tenant system 180 to utilize a secure list of authorized users allowed to access cloud computing platform 110 via tenant system 180.

In an embodiment, cloud authentication system 130 and tenant authentication system 140 may be used in conjunction to perform a two-tiered type of authentication. For example, tenant device 160 authentication may occur at tenant authentication system 140 and cloud authentication system 130. In an embodiment, tenant authentication system 140 may receive login credentials from tenant device 160. Tenant authentication system 140 may then compare the received login credentials to login credentials stored in tenant identity database 145 to determine if the user is authorized to utilize tenant system 180 to access cloud computing platform 110. If so, cloud authentication system 130 may act as a second tier of authentication before access to cloud computing platform 110 is granted. In an embodiment, cloud authentication system 130 may be maintained by host system 170 and/or may require host system 170 authorization before a user may access cloud computing platform 110.

In an embodiment, cloud authentication system 130 may utilize the same login credentials supplied to tenant authentication system 140 to authenticate the tenant device 160. For example, cloud authentication system 130 may compare the received login credentials with host system 170 maintained login credentials in cloud identity database 135. If a match is found, cloud authentication system 130 may grant access to the tenant device 160. In an embodiment, cloud authentication system 130 may request login credentials that may be separate and/or different from the login credentials utilized by tenant authentication system 140. In this case, cloud authentication system 130 may also authenticate the second set of login credentials using login credential information stored in cloud identity database 135.

In an embodiment, usage of tenant authentication system 140 and/or cloud authentication system 130 may depend on the architecture of tenant system 180 and/or whether cloud computing platform 110 is hosted by host system 170 or tenant system 180.

In an embodiment, after successfully accessing cloud computing platform 110, a tenant device 160 may encounter a programming error, crash, a problem requiring debugging or troubleshooting, latency issues, and/or other problems requiring host system 170 support technicians. In situations requiring aid from host system 170, a tenant device 160 may generate an alert, ticket, and/or help ticket requesting aid from within cloud computing platform 110 or external to cloud computing platform 110 to notify host system 170. After receiving this request, host system 170 may deploy a support technician to aid in resolving the problem.

In an embodiment, host system 170 may notify a support user that a particular cloud computing platform 110 and/or a particular tenant device 160 has generated a request for assistance. In an embodiment, host system 170 may provide cloud computing functionality to many cloud computing platforms 110 and a particular cloud computing platform 110 may have requested assistance. In response to receiving this assistance request, a support user may utilize access control manager 120 to access the particular cloud computing platform 110 to provide support.

Access control manager 120 may be a component of host system 170 used to allow authorized users to utilize host system 170. In an embodiment, host system 170 may supply the back-end support to provide the computing functions of cloud computing platform 110. In an embodiment, host system 170 may include one or more processors, memory, servers, routers, modems, and/or antennae configured to instantiate cloud computing platform 110, access control manager 120, cloud authentication system 130, cloud identity database 135, tenant authentication system 140, and/or tenant identity database 145.

When a user utilizes access control manager 120, the user may attempt to access host system 170. Accessing host system 170 may allow a user to manipulate and/or manage the architecture of host system 170 and/or one or more cloud computing platforms 110 that host system 170 is supplying or has supplied to tenant systems 180. To gain access to host system 170, a user device and/or a computing device utilized by the user may supply login credentials to access control manager 120. Access control manager 120 may then utilize cloud authentication system 130 and/or cloud identity database 135 to authenticate the user based on user identification data and/or login credential information stored in cloud identity database 135. In an embodiment, access control manager 120 may utilize login credential information stored in an access control manager 120 database separate from cloud identity database 135. Once a user has been authenticated, the user may utilize granted permissions to manipulate host system 170.

In an embodiment, although a support user may access host system 170 via identification information supplied to access control manager 120, the support user may not necessarily be able to access a particular cloud computing platform 110. This situation may occur when the particular cloud computing platform 110 is hosted remote from host system 170 on tenant system 180 and/or when tenant system 180 maintains a confidential list of authorized users inaccessible to host system 170. Although a support user may be able to access host system 170 based on the support user's credentials, the support user may not have instantaneous access to the particular cloud computing platform 110 that is reporting a problem based on the settings of tenant system 180.

In an embodiment, to grant access to the support user, tenant system 180 may first send an indication to host system 170 via cloud computing platform 110 indicating that tenant system 180 allows support user access. Based on this permission, host system 170 may generate support user permissions on the back-end of cloud computing platform 110 so that tenant system 180 is not required to generate new permissions for the support users. In an embodiment, host system 170 may generate support user permissions without first receiving an explicit command from tenant system 180 allowing host system 170 to generate support user permissions. For example, via the usage of cloud computing platform 110, tenant system 180 may implicitly grant this permission to host system 170.

In an embodiment, host system 170 may generate a single sign-on for support users to access cloud computing platform 110 by granting permissions to the support user account to access cloud computing platform 110. For example, when a support user utilizes access control manager 120, the support user may supply login credentials that are authenticated using cloud authentication system 130 and cloud identity database 135. The support user may then request permission to access cloud computing platform 110 based on a request for aid. The request may occur within host system 170 and access may be granted from an administrator of host system 170 and/or in response to recognizing an identification associated with the request for aid. For example, cloud computing platform 110 may generate a help ticket number, passcode, or other identification that a support user may utilize to obtain permission to manipulate cloud computing platform 110.

To grant this permission, host system 170 may modify permissions associated with the support user's current session. For example, after a support user has provided login credentials and has been authenticated, host system 170 may grant permissions to the support user's current session. In this manner, as long as the support user maintains the session, the support user may access cloud computing platform 110 and trouble shoot problems according to the permissions granted. The permissions granted may include read permission, read/write permission, file modification permission, deletion permission, and/or other customizable cloud computing permissions.

In an embodiment, host system 170 may grant permissions to the support user by modifying user account information in identity database 135. For example, host system 170 may grant permission to the support user's account such that when the support user provides login credentials to access host system 170, host system 170 recognizes that the support user also has access to cloud computing platform 110. In this manner, support users are able to utilize a single sign-on to access host system 170 and cloud computing platform 110. In an embodiment, the granted permissions may be temporary and/or may expire after a number of sessions and/or a certain time period.

In an embodiment, host system 170 may grant permissions to the support user by generating a new user account in cloud identity database 135. This new user account may be an account separate from the account utilized by the support user to gain access to host system 170. In an embodiment, this new user account may be granted permissions to access cloud computing platform 110. In an embodiment, the new user account may be set to expire based on a number of times the new user account is accessed and/or after a certain time period.

In an embodiment, the permissions granted to the support user, either based on associating permissions or generating a new user account, depend on the permissions managed by tenant system 180. For example, tenant system 180 may determine the permissions granted to support users and/or may manage how support users are able to interact with cloud computing platform 110. In an embodiment, while tenant system 180 may dictate the permissions granted, host system 170 may implement, generate, and/or instantiate the permissions and/or facilitate support user access to cloud computing platform 110.

In an embodiment, tenant system 180 may be able to monitor the support users accessing the cloud computing platform 110. For example, tenant system 180 may track and/or display existing accounts with newly granted support user permissions and/or new accounts with support user permissions. In an embodiment, an administrator of tenant system 180 may modify these permissions even when a support user is accessing cloud computing platform 110. In this manner, an administrator of tenant system 180 is able to maintain security while also avoiding the hassle or security threat associated with adding a new user to the list stored in tenant identity database 145.

Based on these configurations, host system 170 is able to facilitate support user access to cloud computing platform 110. Support users are then able to debug and/or correct problems with cloud computing platform 110 as if the support user was utilizing a tenant device 160 to access tenant system 180. Even if tenant system 180 maintains an authentication scheme separate from host system 170, host system 170 is still able to provide support user troubleshooting while still allowing tenant system 180 to retain control over the management of the active permissions. In this manner, tenant systems 180 need not generate new user accounts or allocate hardware resources to maintain these new user accounts. Tenant systems 180 also need not worry about security threats because the support users are directly authenticated by host system 170. In this manner, tenant system 180 need not separately authenticate the support user.

Regarding the components depicted in cloud computing security environment 100, the components may be implemented using various hardware configurations. For example, as previously explained and as depicted in FIG. 1B, host system 170 may include cloud computing platform 110, access control manager 120, cloud authentication system 130, and/or cloud identity database 135. Host system 170 may include one or more processors, memory, servers, routers, modems, and/or antennae configured to interface with network 150 and/or tenant devices 160. In an embodiment, host system 170 may facilitate and/or maintain tenant authentication system 140 and/or tenant identity database 145. In an embodiment, while maintaining and/or storing information related to tenant authentication system 140 and/or tenant identity database 145, host system 170 may not directly access these components.

In an embodiment, host system 170 may interact with tenant devices 160 to provide cloud computing functionality via cloud computing platform 110 to the tenant devices 160. Cloud computing platform 110 executes and manages a cloud-based computing platform and/or tenant device 160 access to the cloud-based computing platform. The cloud-based computing platform may be, for example, a remote desktop, a virtual desktop or virtual computing, a cloud-computing platform, an enterprise computing platform, a cloud-based software application, an Infrastructure as a Service (IaaS) application, a Platform as a Service (PaaS) application, and/or or other types of cloud-based computing. In an embodiment, cloud computing platform 110 may execute an operating system allowing users to perform native computing functions in a virtual environment. For example, users may be able to store, manipulate, and/or manage data and/or content in the virtual environment. In an embodiment, cloud computing platform 110 may allow users to utilize database management systems to manage data.

In an embodiment, to enable the cloud-based computing functionality, cloud computing platform 110 may utilize a centralized hardware architecture using, for example, a server and/or database configuration. In an embodiment, cloud computing platform 110 may utilize a distributed hardware architecture, including distributed systems and/or subsystems. The distributed systems may include one or more servers and/or databases interfaced via network 150.

Host system 170 may also provide access to cloud computing platform 110 to tenant devices 160 using network 150. Tenant devices 160 allow users customize the functionality of the cloud computing provided by cloud computing platform 110. A tenant device 160 may be a computing device, such as, for example, a desktop computer, a laptop computer, a mobile phone, a tablet device, and/or other computing devices capable of enabling cloud-based computing. Tenant devices 160 may communicate with cloud computing platform 110 via network 150 and/or a network protocol to send and receive data over network 150. Network 150 is a network capable of transmitting information either in a wired or wireless manner and may be, for example, the Internet, a Local Area Network (LAN), or a Wide Area Network (WAN). The network protocol may be, for example, a hypertext transfer protocol (HTTP), a TCP/IP protocol, User Datagram Protocol (UDP), Ethernet, cellular, Bluetooth, or an asynchronous transfer mode, and/or a combination of the listed protocols.

In an embodiment as show in FIG. 1C, tenant system 180 may utilize components that overlap with host system 170 and/or may utilize components distinct from host system 170. For example, tenant system 180 may include cloud computing platform 110, tenant authentication system 140, and/or tenant identity database 145. Tenant system 180 may include one or more processors, memory, servers, routers, modems, and/or antennae configured to instantiate cloud computing platform 110, tenant authentication system 140, and/or tenant identity database 145 and/or interface with host system 170. In an embodiment, host system 170 may host cloud computing platform 110 and tenant system 180 may facilitate access to cloud computing platform 110 using tenant authentication system 140 and tenant identity database 145. In this manner, tenant devices 160 communicate with tenant system 180 via network 150. Tenant system 180 may then authenticate the tenant device 160. Once authenticated, tenant system 180 may utilize network 150 communicate with host system 170 and to allow the tenant device 160 to access cloud computing platform 110 as hosted on host system 170.

Figure 2:
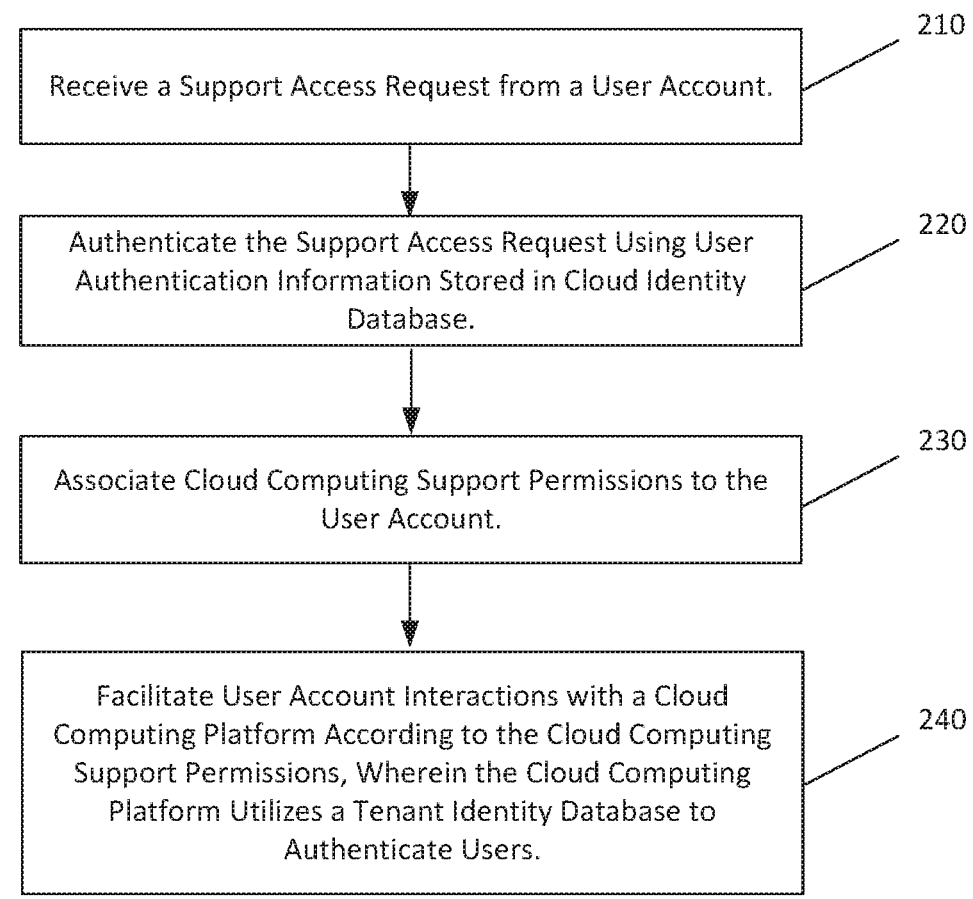
FIG. 2 depicts a flowchart illustrating a method for granting support permission, according to some embodiments.

FIG. 2 depicts a flowchart illustrating a method 200 for granting support permission, according to some embodiments. Method 200 shall be described with reference to FIG. 1A, FIG. 1B, and FIG. 1C; however, method 200 is not limited to that example embodiment.

In an embodiment, host system 170 utilizes method 200 to grant permissions to user accounts existing in cloud identity database 135. The foregoing description will describe an embodiment of the execution of method 200 with respect to host system 170. While method 200 is described with reference to host system 170, method 200 may be executed on any computing device, such as, for example, the computer system described with reference to FIG. 4 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 2, as will be understood by a person of ordinary skill in the art.

In an embodiment, at 210, host system 170 receives a support access request from a user account. The user account may belong to a support technician associated with host system 170. For example, the support technician may be an employee of a company administering host system 170. In an embodiment, the support technician may aid in troubleshooting problems with cloud computing platform 110.

The support access request from the user account may include a request to obtain permissions to access cloud computing platform 110 so that the support technician may troubleshoot issues. For example, the support access request may request that host system 170 grant a read permission, read/write permission, file modification permission, deletion permission, and/or other customizable cloud computing permission to the support technician account. In an embodiment, the support access request may not include an explicit identification of requested permissions. Instead, host system 170 may automatically assign predefined permissions to user accounts designated as support users. For example, when host system 170 designates a particular user account as a support user, host system 170 may automatically grant read permissions to the user account allowing the user account to navigate and/or view content in cloud computing platform 110.

In an embodiment, the support access request may include a ticket number and/or an identifier indicating that a tenant device 160 has requested aid from host system 170. Host system 170 may prompt a user account to prompt this identification before host system 170 grants permissions to the user account to access cloud computing platform 110. In this manner, host system 170 may regulate the users attempting to access cloud computing platform 110. While users may be able to access host system 170 using host-based login credentials stored in cloud identity database 135, host system 170 may prevent access to cloud computing platform 110 unless the particular user account supplies an identification that the user account is responding to an aid request from tenant system 180 and/or tenant device 160. In this manner, not all users that successfully log into host system 170 may access cloud computing platform 110.

At 220, host system 170 may authenticate the support access request using user authentication information stored in cloud identity database 135. In an embodiment, host system 170 may first authenticate a user account attempting to access host system 170. This first authentication may include comparing login credentials supplied by the user account with login credentials of authorized users stored in cloud identity database 135. If the provided login credentials match login credentials stored in an a list of authorized users stored in cloud identity database 135, host system 170 may authenticate the user and may grant user access to host system 170 via this first authentication. In an embodiment, access control manager 120 and/or cloud authentication system 130 may facilitate the authentication of the user account.

In an embodiment, host system 170 may utilize the first authentication to allow a user to access host system 170. In an embodiment, based on the permissions requested from the support access request, host system 170 may perform a second authentication to determine whether the user is authorized to obtain support user permissions and/or access cloud computing platform 110. For example, the second authentication may include determining whether the support access request includes a support ticket and/or whether the support access request includes an identification from tenant system 180 and/or a tenant device 160 that indicates that assistance from a support user is being requested. Checking for this authorization may allow host system 170 to avoid granting unnecessary support user permissions.

In an embodiment, in response to receiving a request to access cloud computing platform 110, host system 170 may generate a notification to an administrator of cloud computing platform 110 indicating that a request has been received. This notification may include identifying information related to the user account requesting permissions. In response, the administrator may choose to authorize the user account and/or may provide a second level of authorization beyond the authentication information stored in cloud identity database 135. Using this authorization, host system 170 may be able to separate the authentication used to grant access to host system 170 and the authentication used to grant access to cloud computing platform 110.

In an embodiment, host system 170 may perform an authentication to allow user account access to host system 170 and cloud computing platform 110 in a single authorization process. In this case, permissions may already be predefined in cloud identity database 135. For example, a particular support user may be able to supply login credentials to access control manager 120. Using cloud authentication system 130, access control manager 120 may authenticate the user and/or allow the user to access host system 170. Access control manager 120 may also recognize a predefined permission associated with the provided login credentials that indicates that the particular user account is authorized to access cloud computing platform 110. In this manner, host system 170 may grant the access to cloud computing platform 110 without requiring a second authentication process.

At 230, host system 170 may associate cloud computing support permissions to the user account. If the user account does not already maintain predefined permissions to access cloud computing platform 110, host system 170 may grant these permissions at 230 following an authorization of the user account. In an embodiment, host system 170 may associate support permissions to the session that the user account is utilizing to access cloud computing platform 110. In this embodiment, as long as the authenticated user account maintains a session with host system 170 and/or cloud computing platform 110, the user account may be able to continue to access cloud computing platform 110 in the manner specified by the support permissions.

In an embodiment, host system 170 may grant permissions by modifying permissions associated with the user account in cloud identity database 135. For example, cloud identity database 135 may initially allow user access to host system 170 based on a user account and/or login credentials supplied. Host system 170 may modify these user accounts so that when the login credentials are supplied, users are also able to access cloud computing platform 110. In an embodiment, because host system 170 controls authentication that allows a user to access host system 170, tenant system 180 may be better able to trust users accessing cloud computing platform 110 that have been authenticated in the same manner as the authentication used to access host system 170.

At 240, after being granted cloud computing support permissions and/or access to cloud computing platform 110, host system 170 may facilitate user account interactions with cloud computing platform 110 according to the cloud computing support permissions. In an embodiment, host system 170 facilitates user account interactions even when a tenant system 180 authenticates access to cloud computing platform 110 using tenant authentication system 140 and/or tenant identity database 145. In this manner, even if tenant system 180 utilizes a list that is inaccessible to host system 170, host system 170 may still grant permissions to authorized support users to access cloud computing platform 110. In this embodiment, host system 170 may facilitate access to cloud computing platform 110 so that tenant system 180 is not required to alter and/or change a configuration to allow support user access.

Figure 3:
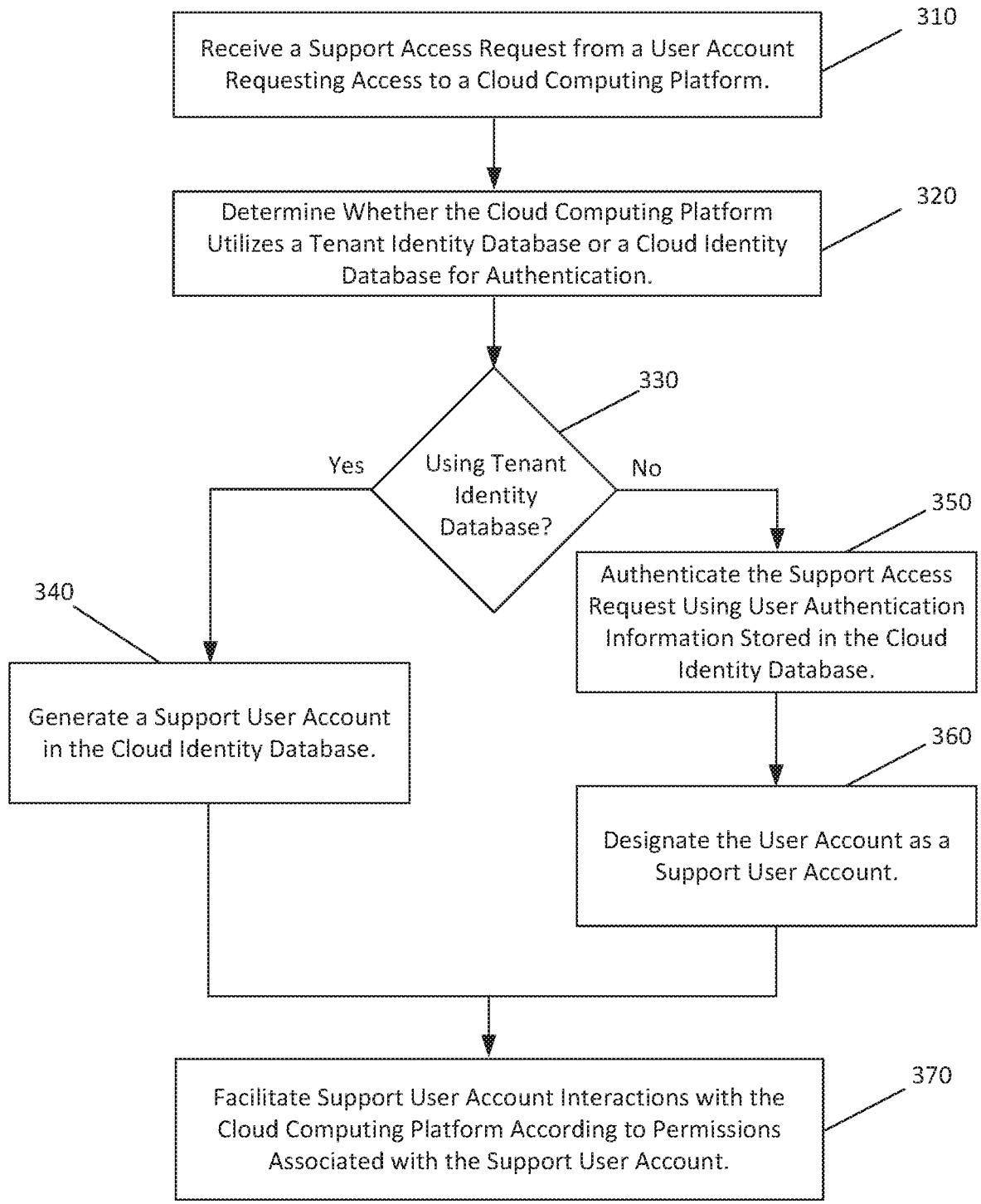
FIG. 3 depicts a flowchart illustrating a method for generating a support user account, according to some embodiments.

FIG. 3 depicts a flowchart illustrating a method 300 for generating a support user account, according to some embodiments. Method 300 shall be described with reference to FIG. 1A, FIG. 1B, and FIG. 1C; however, method 300 is not limited to that example embodiment.

In an embodiment, host system 170 utilizes method 300 to generate a support user account in cloud identity database 135. The foregoing description will describe an embodiment of the execution of method 300 with respect to host system 170. While method 300 is described with reference to host system 170, method 300 may be executed on any computing device, such as, for example, the computer system described with reference to FIG. 4 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

In an embodiment, at 310, host system 170 receives a support access request from a user account requesting access to a cloud computing platform 110. Similar to 210, the user account may belong to a support technician associated with host system 170. For example, the support technician may be an employee of a company administering host system 170. In an embodiment, the support technician may aid in troubleshooting problems with cloud computing platform 110.

The support access request from the user account may include a request to obtain permissions to access cloud computing platform 110 so that the support technician may troubleshoot issues. For example, the support access request may request that host system 170 grant a read permission, read/write permission, file modification permission, deletion permission, and/or other customizable cloud computing permission to the support technician account.

In an embodiment, the support access request may include a ticket number and/or an identifier indicating that a tenant device 160 has requested aid from host system 170. Host system 170 may prompt a user account to prompt this identification before host system 170 grants permissions to the user account to access cloud computing platform 110. In this manner, host system 170 may regulate the users attempting to access cloud computing platform 110. While users may be able to access host system 170 using host-based login credentials stored in cloud identity database 135, host system 170 may prevent access to cloud computing platform 110 unless the particular user account supplies an identification that the user account is responding to an aid request from tenant system 180 and/or tenant device 160. In this manner, not all users that successfully log into host system 170 may access cloud computing platform 110.

At 320, host system 170 may determine whether cloud computing platform 110 and/or tenant system 180 utilizes a tenant identity database 145 or cloud identity database 135 for authentication. As previously discussed, tenant system 180 may utilize a tenant identity database 145 that tenant system 180 maintains independent from host system 170. In this manner, tenant system 180 may maintain a confidential list of authorized user accounts and/or login credentials that host system 170 is unable to access. This configuration may grant tenant system 180 more privacy and/or control over user accounts and access to cloud computing platform 110.

In an embodiment, tenant system 180 may not utilize a tenant identity database 145 and may instead opt to utilize cloud identity database 135 to maintain a list of authorized users. In this manner, tenant system 180 may allow host system 170 to maintain and/or control the list of users authorized to access cloud computing platform 110. This configuration may allow easier facilitation of an authorization process because tenant system 180 is not required to maintain a separate list of authorized individuals. In an embodiment, tenant system 180 may use a combination of both cloud identity database 135 and tenant identity database 145. For example, the tenant system 180 may store different user accounts and/or login credentials on the different databases.

In an embodiment, at 330, host system 170 may determine whether cloud computing platform 110 utilizes a tenant identity database 145. Host system 170 may determine whether tenant system 180 is maintaining a confidential and/or independent user authorization list. Host system 170 may query tenant system 180 to determine whether metadata utilized by tenant system 180 indicates the usage of a tenant identity database 145. In an embodiment, host system 170 may make this determination based on a previous predefined indication supplied by tenant system 180. In an embodiment, host system 170 may query cloud identity database 135. If host system 170 receives no information and/or incomplete information related to user authorization, host system 170 may determine that tenant system 180 is using tenant identity database 145.

At 330, based on the determination of whether cloud computing platform 110 utilizes tenant identity database 145, host system 170 may determine a process for granting access to support users providing support to tenant system 180 and/or tenant devices 160.

At 340, if cloud computing platform 110 utilizes tenant identity database 145, host system 170 may generate a support user account in the cloud identity database 135. In an embodiment, this support user account may be a new user account separate from the user account utilized to access host system 170. This new support user account may have permissions to access cloud computing platform 110 under a specially designated user account. In this manner, host system 170 may keep support user accounts accessing cloud computing platform 110 separate from user accounts utilized to access host system 170. In an embodiment, host system 170 may grant control to tenant system 180 to monitor and/or manage the permissions associated with the new support user accounts. Tenant system 180 may be able to monitor the interactions between the new user accounts and cloud computing platform 110. In this configuration, because the new support user accounts are separate from the accounts utilized by users to access host system 170, host system 170 will be able to maintain the confidentiality of user information stored in cloud identity database 135 while still allowing tenant system 180 to control permissions associated with the new support user accounts. In an embodiment, this configuration prevents tenant system 180 from viewing and/or modifying user account information associated with the user account and/or login credentials used to grant access to host system 170.

At 350, if cloud computing platform 110 does not utilize tenant identity database 145, host system 170 may authenticate the support access request using user authentication information stored in cloud identity database 135. At 360, host system 170 may designate the user account as a support user account and/or associate permissions with the user account to allow the user account to access cloud computing platform 110. In an embodiment, if tenant system 180 utilizes cloud identity database 135 to manage a list of authorized users, tenant system 180 may grant permission to host system 170 to maintain the list of authorized users. In this case, host system 170 may associate permissions to users authenticated to access host system 170 based on the shared storage location of user authorization. The shared storage location at cloud identity database 135 may allow host system 170 to manage both the user accounts authorized to access host system 170 as well as the user accounts authorized to access tenant system 180. Based on this user authorization architecture, host system 170 may grant permissions to already existing host system 170 user accounts to also be allowed to access cloud computing platform 110.

In an embodiment, host system 170 may format the already existing user account and/or grant permissions to the already existing user account so that the user account appears to be an authorized user to tenant system 180. In this case, tenant system 180 may grant access to a support user based on the permissions granted and/or associated with the support user as defined in cloud identity database 135.

At 370, after receiving access to cloud computing platform 110 either via 340 and/or 350 and 360, host system 170 may facilitate support user account interactions with cloud computing platform 110 according to permissions associated with the support user account. In an embodiment, host system 170 instantiates cloud computing platform 110 and authorized support users may access cloud computing platform 110 by supplying login credentials to host system 170. In an embodiment, the support users may utilize tenant system 180 as an intermediary to access cloud computing platform 110.

After obtaining access to cloud computing platform 110, the support user account may interact with cloud computing platform 110 according to the permissions associated with the support user account. For example, if support user account has been granted the permission to read files and/or view content on cloud computing platform 110, the support user may browse and/or navigate through the content of cloud computing platform 110.

In an embodiment, tenant system 180 may monitor the interactions between the support user account and cloud computing platform 110. An administrator of tenant system 180 may also revoke and/or terminate access to the support user account. In an embodiment, tenant system 180 and/or a tenant device 160 may perform a screen share and/or may indicate to the support user account a specific problem encountered with cloud computing platform 110. In an embodiment, the support user account may access and/or manipulate the back-end components of host system 170 hosting cloud computing platform 110 to facilitate fixes to cloud computing platform 110. In this manner, host system 170 is able to provide support assistance to tenant system 180 without requiring tenant system 180 to grant new access or generate a new user account for the support user.

Figure 4:
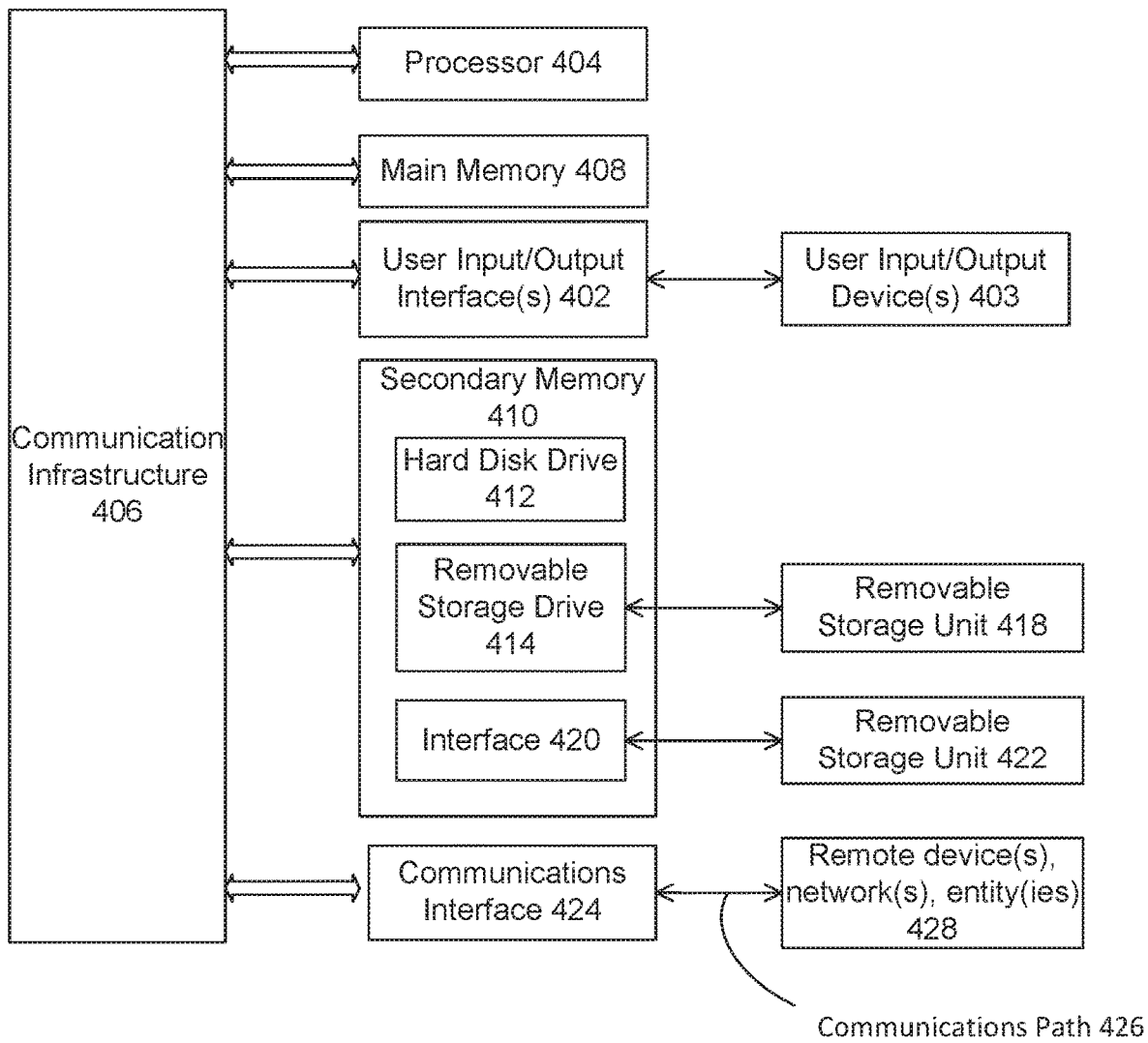
FIG. 4 depicts an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or secondary memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
determining that a host system hosts a cloud computing platform for a tenant system;
determining that the tenant system maintains a confidential list of authorized users inaccessible to the host system and utilizes an authorization process independent from an authorization process used by the host system to grant or deny permission to the authorized users on the confidential list to access the cloud computing platform hosted by the host system;
receiving, at the tenant system, a cloud computing platform access request from a support technician user account associated with the host system;
determining, by the tenant system, that the cloud computing platform access request is responsive to and identifies an assistance request originating from the tenant system;
generating a new user support account, separate from the confidential list of authorized users, for the support technician, wherein the confidential list of authorized users remains inaccessible to the support technician using the new user support account; and
granting, by the tenant system, access to the support technician to access the cloud computing platform using the new user support account responsive to the assistance request, wherein the host system is configured to limit access to the cloud computing platform to the support technician user account based on the access.

2. The computer implemented method of claim 1, wherein the assistance request includes a help ticket identification generated by the cloud computing platform.

3. The computer implemented method of claim 1, wherein the assistance request includes an identification of a tenant device configured to utilize the tenant system to access the cloud computing platform.

4. The computer implemented method of claim 1, wherein the cloud computing platform access request includes login credentials, the method further comprising:
 searching a database managed by the tenant system for information matching the login credentials; and
 associating a cloud computing access permission with the support technician user account.

5. The computer implemented method of claim 1, further comprising:
 determining that the tenant system maintains a database of authorized users separate from the host system; and
 in response to receiving the cloud computing platform access request from the user account, generating a support user account in the tenant system, wherein the support user account includes a permission to access the cloud computing platform.

6. The computer implemented method of claim 1, further comprising:
 granting, by the host system to the tenant system, a permission to monitor user account interactions with the cloud computing platform.

7. The computer implemented method of claim 1, further comprising:
 granting, by the host system to the tenant system, a permission to modify cloud computing platform interactions available to the support technician user account.

8. A system, comprising:
 a memory; and
 at least one processor coupled to the memory and configured to:
 determine that a host system hosts a cloud computing platform for a tenant system;
 determine that the tenant system maintains a confidential list of authorized users inaccessible to the host system and utilizes an authorization process independent from an authorization process used by the host system to grant or deny permission to the authorized users on the confidential list to access the cloud computing platform hosted by the host system;
 receive, at the tenant system, a cloud computing platform access request from a support technician user account associated with the host system;
 determine, by the tenant system, that the cloud computing platform access request is responsive to and identifies an assistance request originating from the tenant system;
 generate a new user support account, separate from the confidential list of authorized users, for the support technician, wherein the confidential list of authorized users remains inaccessible to the support technician using the new user support account; and
 grant, by the tenant system, access to the support technician to access the cloud computing platform using the new user support account responsive to the assistance request, wherein the host system is configured to limit access to the cloud computing platform to the support technician user account based on the access.

9. The system of claim 8, wherein the assistance request includes a help ticket identification generated by the cloud computing platform.

10. The system of claim 8, wherein the assistance request includes an identification of a tenant device configured to utilize the tenant system to access the cloud computing platform.

11. The system of claim 8, wherein the cloud computing platform access request includes login credentials and wherein the at least one processor is further configured to:
 search a database managed by the tenant system for information matching the login credentials; and
 associate a cloud computing access permission with the support technician user account.

12. The system of claim 8, wherein the at least one processor is further configured to:
 determine that the tenant system maintains a database of authorized users separate from the host system; and
 in response to receiving the cloud computing platform access request from the user account, generate a support user account in the tenant system, wherein the support user account includes a permission to access the cloud computing platform.

13. The system of claim 8, wherein the at least one processor is further configured to:
 grant, by the host system to the tenant system, a permission to monitor user account interactions with the cloud computing platform.

14. The system of claim 8, wherein the at least one processor is further configured to:
 grant, by the host system to the tenant system, a permission to modify cloud computing platform interactions available to the support technician user account.

15. A non-transitory computer-readable device having instructions stored thereon that, when executed by at least one computing device, causes the at least one computing device to perform operations comprising:
 determining that a host system hosts a cloud computing platform for a tenant system;
 determining that the tenant system maintains a confidential list of authorized users inaccessible to the host system and utilizes an authorization process independent from an authorization process used by the host system to grant or deny permission to the authorized users on the confidential list to access the cloud computing platform hosted by the host system;
 receiving, at the tenant system, a cloud computing platform access request from a support technician user account associated with the host system;
 determining, by the tenant system, that the cloud computing platform access request is responsive to and identifies an assistance request originating from the tenant system;
 generating a new user support account, separate from the confidential list of authorized users, for the support technician, wherein the confidential list of authorized users remains inaccessible to the support technician using the new user support account; and
 granting, by the tenant system, access to the support technician to access the cloud computing platform using the new user support account responsive to the assistance request, wherein the host system is configured to limit access to the cloud computing platform to the support technician user account based on the access.

16. The non-transitory computer-readable device of claim 15, wherein the assistance request includes an identification of a tenant device configured to utilize the tenant system to access the cloud computing platform.

17. The non-transitory computer-readable device of claim 15, wherein the cloud computing platform access request includes login credentials, the operations further comprising:
  searching a database managed by the tenant system for information matching the login credentials; and
  associating a cloud computing access permission with the support technician_user account.

18. The method of claim 1, wherein the access comprises single session access.

19. The method of claim 1, further comprising:
  modifying, by the tenant system, permissions associated with the support user account.

20. The method of claim 19, wherein the modifying comprises terminating, by the tenant system, access to the cloud system for the support user account.

\* \* \* \* \*